United States Patent
Li et al.

(10) Patent No.: US 11,076,641 B2
(45) Date of Patent: Aug. 3, 2021

(54) LIQUID SUPPLY WITH SEALING AGENT IN A SPIRAL CONTAINER

(71) Applicant: FONTEM HOLDINGS 1 B.V., Amsterdam (NL)

(72) Inventors: Wei Li, Beijing (CN); Xinliang Tong, Beijing (CN)

(*) Notice: Subject to any disclaimer, the term of this patent is extended or adjusted under 35 U.S.C. 154(b) by 0 days.

(21) Appl. No.: 16/712,561

(22) Filed: Dec. 12, 2019

(65) Prior Publication Data

US 2020/0116259 A1    Apr. 16, 2020

Related U.S. Application Data

(63) Continuation of application No. 15/565,657, filed as application No. PCT/CN2015/076868 on Apr. 17, 2015, now Pat. No. 10,520,089.

(51) Int. Cl.
| | |
|---|---|
| A24F 13/00 | (2006.01) |
| A24F 17/00 | (2006.01) |
| A24F 25/00 | (2006.01) |
| A24F 40/30 | (2020.01) |
| A24F 40/42 | (2020.01) |
| F16J 15/14 | (2006.01) |
| A24F 40/10 | (2020.01) |

(52) U.S. Cl.
CPC .............. *A24F 40/30* (2020.01); *A24F 40/42* (2020.01); *F16J 15/14* (2013.01); *A24F 40/10* (2020.01)

(58) Field of Classification Search
CPC ......... A24F 47/008; A24F 47/00; A24F 40/48

USPC ................................................... 131/328, 329
See application file for complete search history.

(56) References Cited

U.S. PATENT DOCUMENTS

| | | | | |
|---|---|---|---|---|
| 4,373,539 | A | * | 2/1983 | Innacelli ................ A24D 3/045 131/209 |
| 5,423,793 | A | | 6/1995 | Isono et al. |
| 5,877,390 | A | | 3/1999 | Kuriyama et al. |
| 6,003,737 | A | | 12/1999 | Mascitelli |
| 6,164,501 | A | | 12/2000 | Stradella |
| 8,689,805 | B2 | | 4/2014 | Hon |
| 8,910,641 | B2 | | 12/2014 | Hon |
| 9,038,642 | B2 | | 5/2015 | Liu |
| 10,004,870 | B2 | * | 6/2018 | Yamada ................ A61M 11/042 |
| 10,143,234 | B2 | * | 12/2018 | Hon ......................... H05B 3/22 |
| 10,251,423 | B2 | * | 4/2019 | Mamoun ............... H05B 3/0014 |
| 2010/0307518 | A1 | | 12/2010 | Wang |
| 2011/0036363 | A1 | | 2/2011 | Urtsev et al. |

(Continued)

FOREIGN PATENT DOCUMENTS

| | | |
|---|---|---|
| CN | 102655773 A | 9/2012 |
| CN | 202525085 U | 11/2012 |

(Continued)

*Primary Examiner* — Abdullah A Riyami
*Assistant Examiner* — Thang H Nguyen
(74) *Attorney, Agent, or Firm* — Perkins Coie LLP; Kenneth H. Ohriner

(57) ABSTRACT

An electronic cigarette including a liquid supply, an air inlet, an inhalation port, and an atomizer. The liquid supply has a housing with a spiral container, having an outlet for directing a liquid held within the container out to the atomizer and at least one inlet sealed by a sealing agent to impede movement of the liquid. An air channel leads from the air inlet through the atomizer to the inhalation port for directing an aerosol generated at the atomizer to the inhalation port.

17 Claims, 12 Drawing Sheets

(56) References Cited

U.S. PATENT DOCUMENTS

| | | |
|---|---|---|
| 2011/0094523 A1* | 4/2011 | Thorens ............... H05B 1/0244 131/194 |
| 2011/0268480 A1* | 11/2011 | Katano .............. G03G 15/2096 399/320 |
| 2012/0037267 A1* | 2/2012 | Senno ................... B29C 73/166 141/38 |
| 2013/0161351 A1 | 6/2013 | Eini et al. |
| 2013/0228191 A1* | 9/2013 | Newton ................ A61M 15/06 131/329 |
| 2014/0109921 A1 | 4/2014 | Chen |
| 2014/0144429 A1 | 5/2014 | Wensley et al. |
| 2014/0190496 A1 | 7/2014 | Wensley et al. |
| 2014/0196728 A1 | 7/2014 | Lisan et al. |
| 2015/0027470 A1 | 1/2015 | Kane et al. |
| 2015/0173417 A1 | 6/2015 | Gennrich et al. |
| 2015/0272216 A1 | 10/2015 | Dai et al. |
| 2016/0255876 A1* | 9/2016 | Rostami ................. A24F 40/10 |
| 2017/0181468 A1* | 6/2017 | Bowen ................... A24F 42/10 |
| 2018/0297047 A1* | 10/2018 | Tong ....................... A24F 40/42 |
| 2019/0117921 A1* | 4/2019 | Bender, II ......... A61M 16/0093 |

FOREIGN PATENT DOCUMENTS

| | | |
|---|---|---|
| CN | 203152481 U | 8/2013 |
| CN | 103732280 A | 4/2014 |
| CN | 203737489 U | 7/2014 |
| CN | 103960781 A | 8/2014 |
| CN | 204048047 U | 12/2014 |
| CN | 104305529 A | 1/2015 |
| CN | 104394721 A | 3/2015 |
| CN | 104432542 A | 3/2015 |
| CN | 104544570 A | 4/2015 |
| CN | 204560966 U | 8/2015 |
| CN | 102387719 B | 3/2016 |
| EP | 2614731 A1 | 7/2013 |
| EP | 2719416 A1 | 4/2014 |
| GB | 2524295 A | 9/2015 |
| WO | 2017028295 A1 | 2/2017 |

* cited by examiner

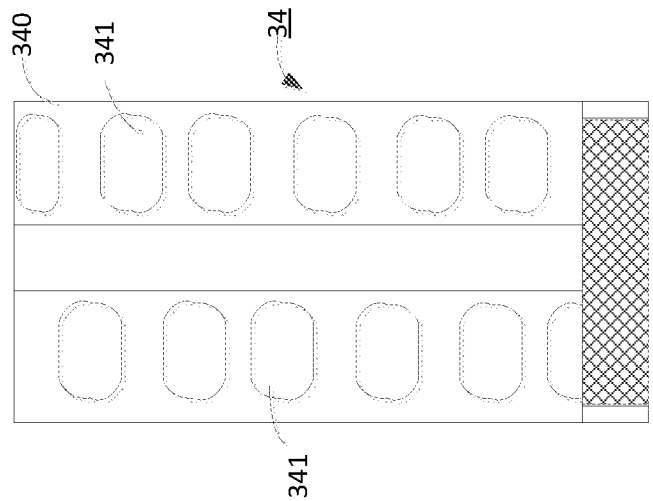
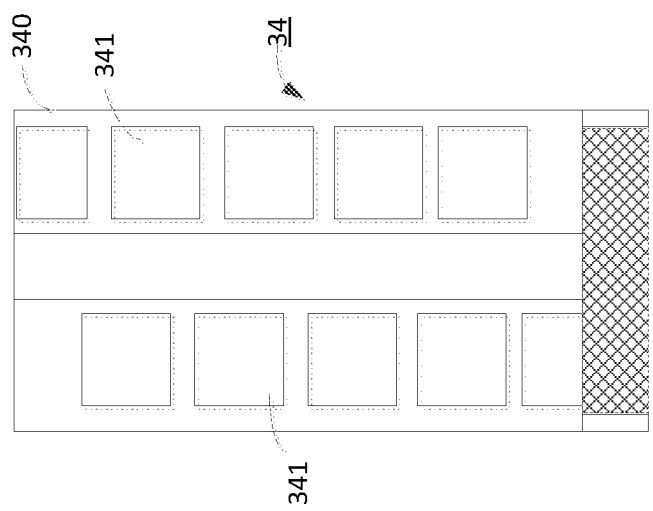
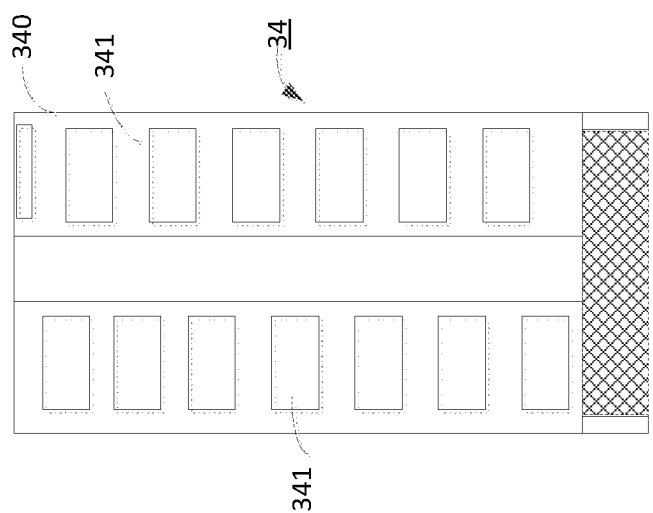

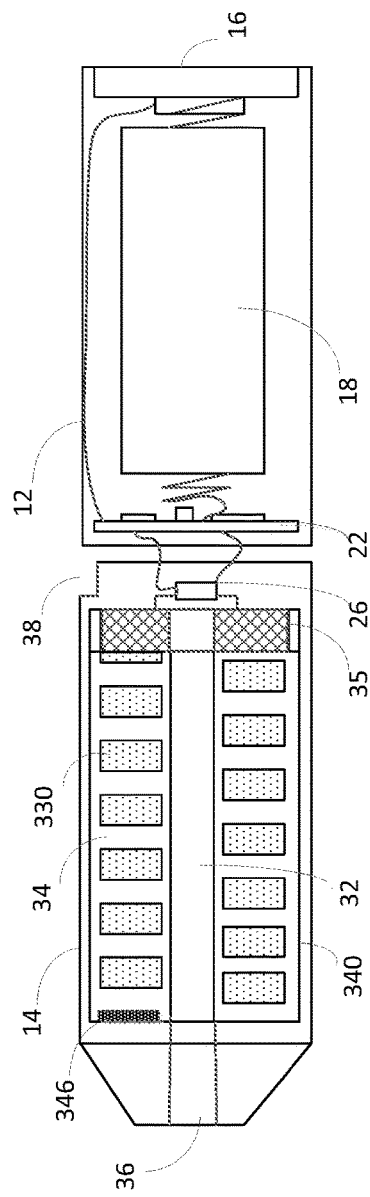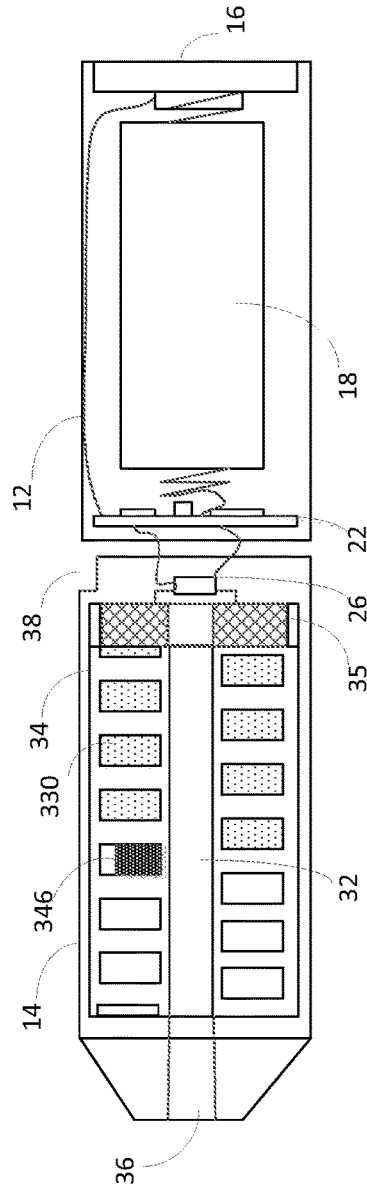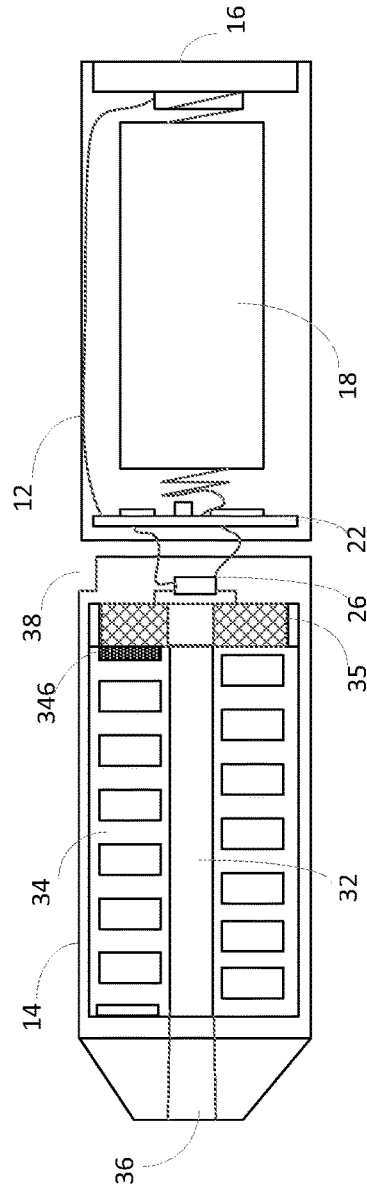

LIQUID SUPPLY WITH SEALING AGENT IN A SPIRAL CONTAINER

CROSS-REFERENCE TO RELATED APPLICATION(S)

This application is a continuation of U.S. application Ser. No. 15/565,657, filed Oct. 10, 2017, now pending, which is a 35 U.S.C. Section 371 National Stage Application of International Application No. PCT/CN2015/076868, filed Apr. 17, 2015. The applications listed above are incorporated herein by reference.

TECHNICAL FIELD

The present invention relates generally to electronic smoking devices and in particular electronic cigarettes.

BACKGROUND

An electronic smoking device, such as an electronic cigarette (e-cigarette), typically has a housing accommodating an electric power source (e.g. a single use or rechargeable battery, electrical plug, or other power source), and an electrically operable atomizer. The atomizer vaporizes or atomizes liquid supplied from a reservoir or liquid supply and provides vaporized or atomized liquid as an aerosol. Control electronics control the activation of the atomizer. In some electronic cigarettes, an airflow sensor is provided within the electronic smoking device which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

In certain electronic cigarettes, the Liquid supply is provided by a tubular body containing liquid holding material such as natural fiber, artificial fiber or foam metal or foamed ceramic material, or a combination of them for holding liquid. Many e-cigarettes which have a central passage for the aerosol to flow to the inhalation port so as to be delivered to a user. The central passage could be provided through the liquid holding material. In this case, the liquid holding material is always exposed to air. Air tends to oxidize the active components in the liquid, especially nicotine.

In many electronic cigarettes, liquid in the liquid holding material cannot be completely consumed as the wicking effect of the liquid guiding gasket leads in to the atomizer is no longer sufficient to draw liquid from the liquid holding material when for example, about 10%-20% percent of the volume remains in the liquid supply. As a result, there is always a certain amount of unused liquid in a reservoir.

It is therefore a need in the art for a new reservoir design.

SUMMARY OF THE INVENTION

In accordance with one aspect of the present invention there is provided an electronic cigarette that comprises a liquid supply having a spiral container. The spiral container has an outlet for directing a liquid held within the container out to the atomizer and at least one inlet sealed by a sealing agent to impede movement of the liquid; and an air channel that communicates with the air inlet and the inhalation port for directing an aerosol generated at the atomizer.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, same element number indicates same element in each of the views:

FIGS. 3A to 3F are variations of the cut-off sections view of FIG. 3;

FIGS. 6A to 6C are exemplary states during operation of the electronic cigarette illustrated in FIG. 5;

DESCRIPTION OF THE PREFERRED EMBODIMENTS

Figure 1:
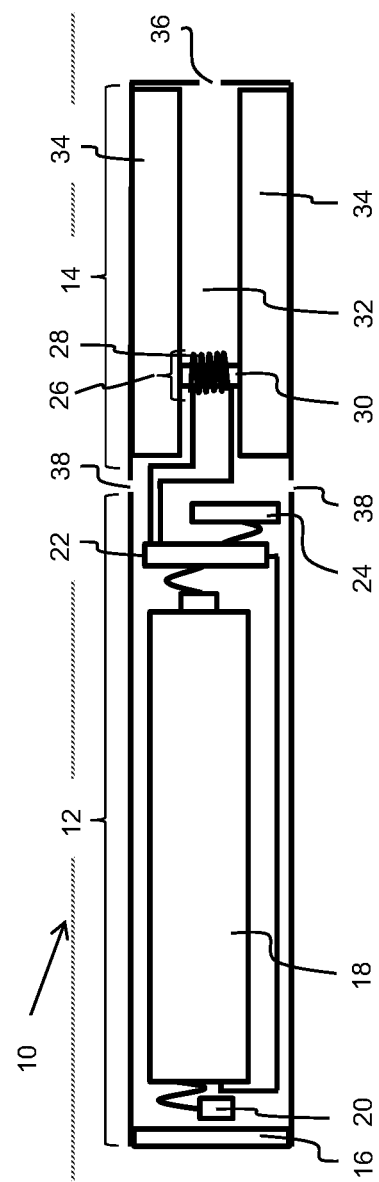
FIG. 1 is a schematic cross-sectional illustration of an exemplary e-cigarette.

As is shown in FIG. 1, an e-cigarette 10 typically has a housing comprising a cylindrical hollow tube having an end cap 16. The cylindrical hollow tube may be single piece or a multiple piece tube. In FIG. 1, the cylindrical hollow tube is shown as a two piece structure having a battery portion 12 and an atomizer/liquid reservoir portion 14. Together the battery portion 12 and the atomizer/liquid reservoir portion 14 form a cylindrical tube which is approximately the same size and shape as a conventional cigarette, typically about 100 mm with a 7.5 mm diameter, although lengths may range from 70 to 150 or 180 mm, and diameters from 5 to 20 mm.

The battery portion 12 and atomizer/liquid reservoir portion 14 are typically made of steel or hardwearing plastic and act together with the end caps to provide a housing to contain the components of the e-cigarette 10. The battery portion 12 and a atomizer/liquid reservoir portion 14 may be configured to fit together by a friction push fit, a snap fit, or a bayonet attachment, magnetic fit, or screw threads. The end cap 16 is provided at the front end of the main body 12. The end cap 16 may be made from translucent plastic or other translucent material to allow an LED 20 positioned near the end cap to emit light through the end cap. The end cap can be made of metal or other materials that do not allow light to pass.

An air inlet may be provided in the end cap, at the edge of the inlet next to the cylindrical hollow tube, anywhere along the length of the cylindrical hollow tube, or at the connection of the battery portion 12 and the atomizer/liquid reservoir portion 14. FIG. 1 shows a pair of air inlets 38 provided at the intersection between the battery portion 12 and the atomizer/liquid reservoir portion 14.

A battery 18, a light emitting diode (LED) 20, control electronics 22 and optionally an airflow sensor 24 are provided within the cylindrical hollow tube battery portion 12. The battery 18 is electrically connected to the control electronics 22, which is electrically connected to the LED 20 and the airflow sensor 24. In this example the LED 20 is at the front end of the main body 12, adjacent to the end cap 16 and the control electronics 22 and airflow sensor 24 are provided in the central cavity at the other end of the battery 18 adjacent the atomizer/liquid reservoir portion 14.

The airflow sensor 24 acts as a puff detector, detecting a user puffing or sucking on the mouthpiece portion 14 of the e-cigarette 10. The airflow sensor 24 can be any suitable sensor for detecting changes in airflow or air pressure such a microphone switch including a deformable membrane which is caused to move by variations in air pressure. Alternatively the sensor may be a Hall element or an electro-mechanical sensor.

The control electronics 22 are also connected to an atomizer 26. In the example shown, the atomizer 26 includes a heating coil 28 which is wrapped around a wick 30 extending across a central passage 32 of the atomizer/liquid reservoir portion 14. The coil 28 may be positioned anywhere in the atomizer and may be transverse or parallel to the liquid reservoir. The wick 30 and heating coil 28 do not completely block the central passage 32. Rather an air gap is provided on either side of the heating coil 28 enabling air to flow past the heating coil 28 and the wick 30. The atomizer may alternatively use other forms of heating elements, such as ceramic heaters, or fiber or mesh material heaters. Nonresistance heating elements such as sonic, piezo and jet spray may also be used in the atomizer in place of the heating coil.

The central passage 32 is surrounded by a cylindrical liquid supply 34 with the ends of the wick 30 abutting or extending into the liquid supply 34. The wick 30 may be a porous material such as a bundle of fiberglass fibers, with liquid in the liquid supply 34 drawn by capillary action from the ends of the wick 30 towards the central portion of the wick 30 encircled by the heating coil 28.

The liquid supply 34 may alternatively include wadding soaked in liquid which encircles the central passage 32 with the ends of the wick 30 abutting the wadding. In other embodiments the liquid supply 34 may comprise a toroidal cavity arranged to be filled with liquid and with the ends of the wick 30 extending into the toroidal cavity.

An air inhalation port 36 is provided at the back end of the atomizer/liquid reservoir portion 14 remote from the end cap 16. The inhalation port 36 may be formed from the cylindrical hollow tube atomizer/liquid reservoir portion 14 or maybe formed in an end cap.

In use, a user sucks on the e-cigarette 10. This causes air to be drawn into the e-cigarette 10 via one or more air inlets, such as air inlets 38 and to be drawn through the central passage 32 towards the air inhalation port 36. The change in air pressure which arises is detected by the airflow sensor 24 which generates an electrical signal that is passed to the control electronics 22. In response to the signal, the control electronics 22 activates the heating coil 28 which causes liquid present in the wick 30 to be vaporized creating an aerosol (which may comprise gaseous and liquid components) within the central passage 32. As the user continues to suck on the e-cigarette 10, this aerosol is drawn through the central passage 32 and inhaled by the user. At the same time the control electronics 22 also activates the LED 20 causing the LED 20 to light up which is visible via the translucent end cap 16 mimicking the appearance of a glowing ember at the end of a conventional cigarette. As liquid present in the wick 30 is converted into an aerosol more liquid is drawn into the wick 30 from the liquid supply 34 by capillary action and thus is available to be converted into an aerosol through subsequent activation of the heating coil 28.

Some e-cigarette are intended to be disposable and the electric power in the battery 18 is intended to be sufficient to vaporize the liquid contained within the liquid supply 34 after which the e-cigarette 10 is thrown away. In other embodiments the battery 18 is rechargeable and the liquid supply is refillable. In the cases where the liquid supply 34 is a toroidal cavity, this may be achieved by refilling the liquid supply via a refill port. In other embodiments the atomizer/liquid reservoir portion 14 of the e-cigarette 10 is detachable from the battery portion 12 and a new atomizer/liquid reservoir portion 14 can be fitted with a new liquid supply 34 thereby replenishing the supply of liquid. In some cases, replacing the liquid supply 34 may involve replacement of the heating coil 28 and the wick 30 along with the replacement of the liquid supply 34.

The new liquid supply 34 may be in the form of a cartridge having a central passage 32 through which a user inhales aerosol. In other embodiments, aerosol may flow around the exterior of the cartridge 32 to an air inhalation port 36.

Of course, in addition to the above description of the structure and function of a typical e-cigarette 10, variations also exist. For example, the LED 20 may be omitted. The airflow sensor 24 may be placed adjacent the end cap 16 rather than in the middle of the e-cigarette. The airflow sensor 24 may be replaced with a switch which enables a user to activate the e-cigarette manually rather than in response to the detection of a change in air flow or air pressure.

Different types of atomizers may be used. Thus for example, the atomizer may have a heating coil in a cavity in the interior of a porous body soaked in liquid. In this design aerosol is generated by evaporating the liquid within the porous body either by activation of the coil heating the porous body or alternatively by the heated air passing over or through the porous body. Alternatively the atomizer may use a piezoelectric atomizer to create an aerosol either in combination or in the absence of a heater.

Figure 2:
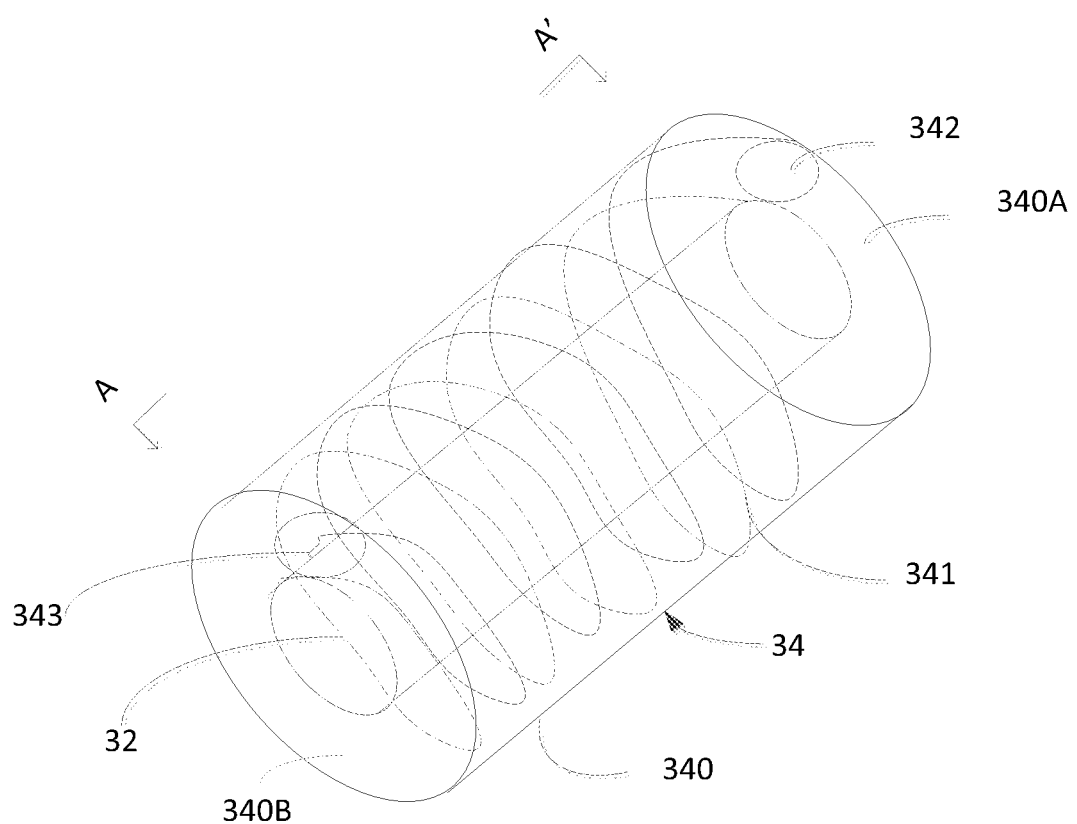
FIG. 2 is a perspective illustration of a liquid supply with a spiral container.

FIG. 2 is a perspective illustration of a liquid supply 34 according to one embodiment of the invention. The liquid supply 34 comprises a tubular housing 340 having a center passage 32, a spiral container 341 arranged around the center passage 32 for holding and conducting liquid, the spiral container has an inlet 342 in liquid communication with one end of the housing and an outlet 343 in liquid communication with an opposite end of the housing. The inlet 342 is provided at the end portion 340A of the tubular housing 340 at any position radially offset from the center passage 32 and the outlet 343 is provided on an opposite end portion 340B of the tubular housing at any position radially offset from the center passage 32.

Figure 3:
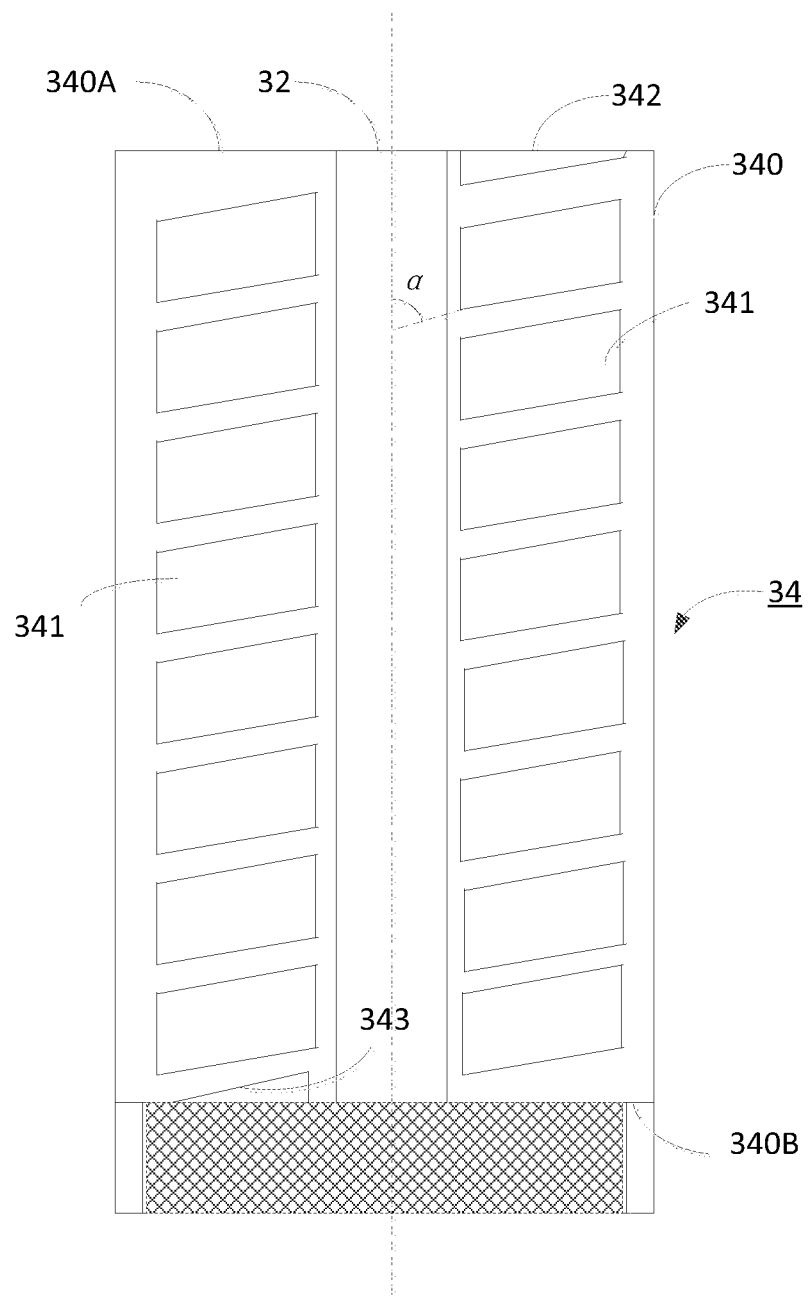
FIG. 3 is an exemplary cut-off sectional view along line A-A' of the liquid supply in FIG. 2.
Figure 3C:
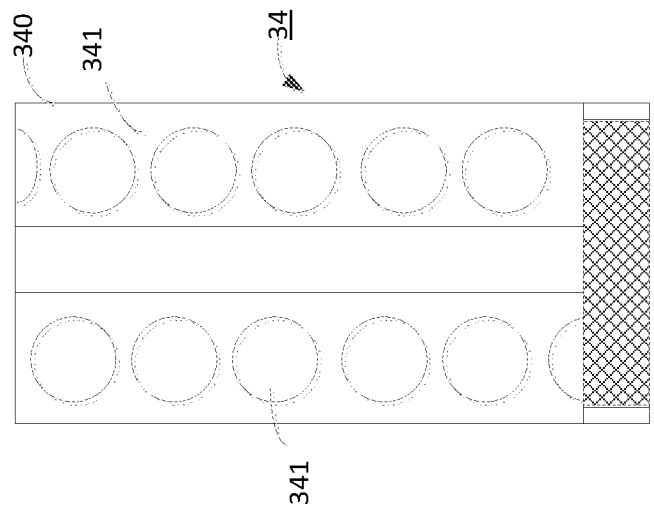
Figure 3B:
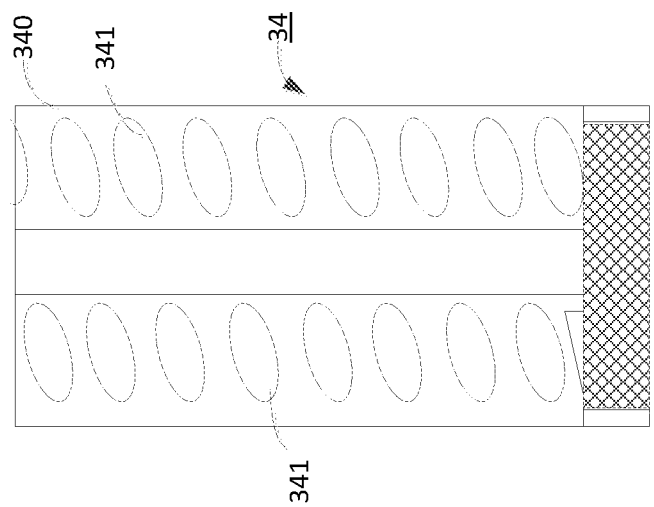
Figure 3A:
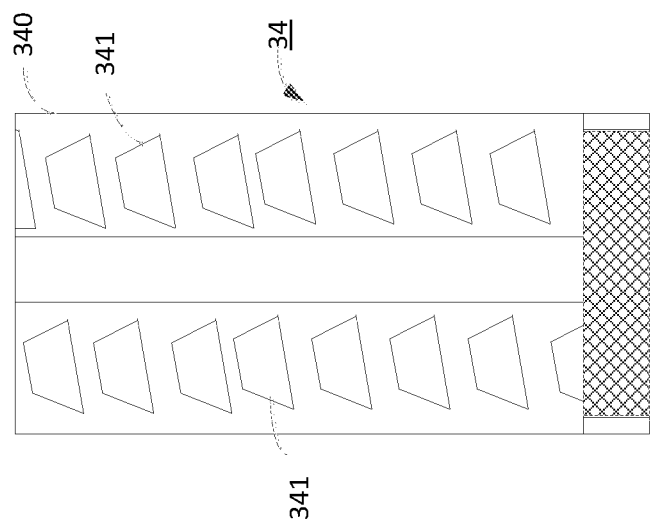

FIG. 3 is a sectional view taken along a plane A-A' of FIG. 2 and showing a cross section area of the spiral container 341 which can be in the form of parallel channels of constant diameter. Possible alternative cross-sectional designs of the channel are illustrated in FIGS. 3A-3F, where the channels can be round, oval, rectangular, square, trapezoid or kidney shaped. In case of an oblong shape, such as rectangular, oval or kidney shape, the channel can have a high aspect ratio to maximize capacity of the spiral container.

As shown in FIG. 3, the parallel channels can be arranged at an inclination angel α from the center axis, for example, 5 degrees, 15, 30, 60, 75 or 90 degrees. Larger inclination angles such as an inclination angle of 75 degrees tend to bring larger capacity to the container and to facilitate fabrication of the container.

In the embodiment shown in FIGS. 2 and 3, the center passage 32 is within the internal surface of the spiral container. With different internal surface designs, the center passage 32 may have different shapes, such as cylindrical or conical. The smooth surfaces forming the center passage may be used to reduce adhesion of aerosol droplet can also be treated to a higher smoothness so that aerosol passing though the center passage does not inclined to attach to the inward surface.

Figure 4A:
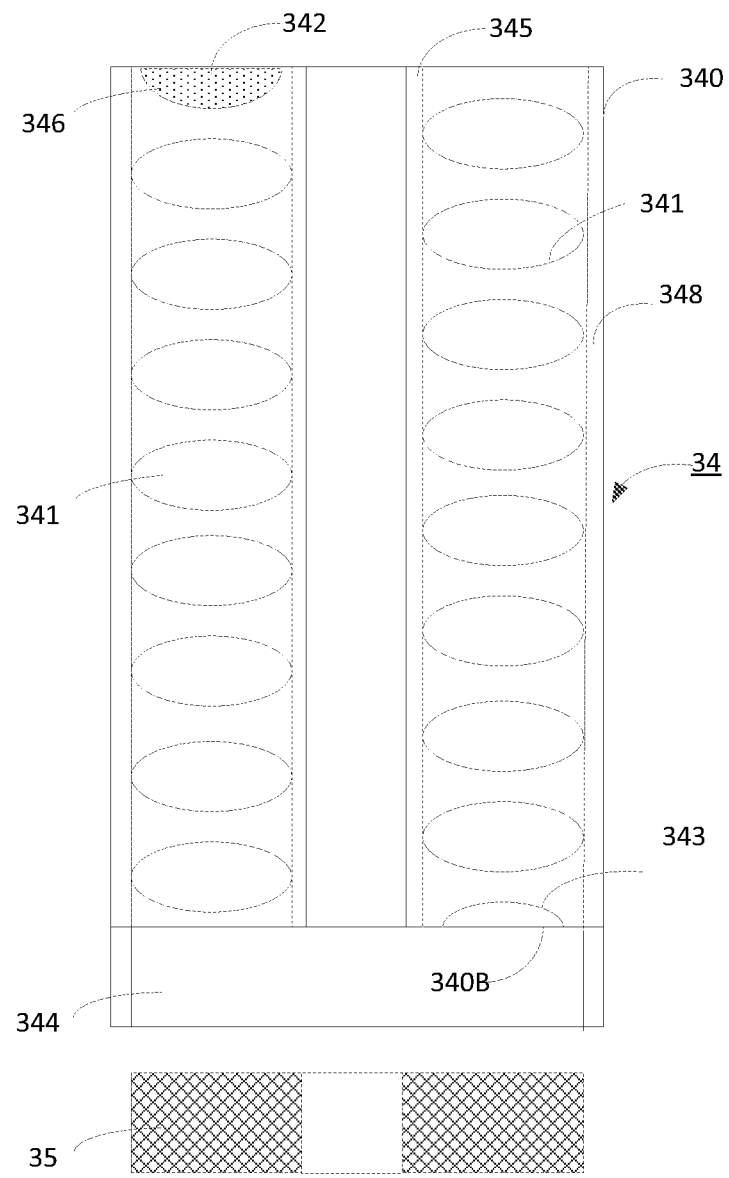
FIG. 4A is a cut-off section view of a liquid supply with a separate spiral container.

In other embodiments, as shown in FIG. 4A, the center passage 32 can be defined by a separate tubular wall 345 which is radially smaller than the external wall 348 of the housing 340. The spiral container 341 in these designs can be a separable part from the housing, such as a tube or hose made of bendable materials such as synthetic materials, for example, plastics, polymers, silicon, rubber, and metals, for example aluminum, steel and copper and/or alloys thereof. The space between the spiral container and the tubular wall 345 and external wall 348 of the housing can be filled with filler material or sealant, for example curable semi-solid material, such as polylactic acid, acrylonitrile butadiene styrene, nylon, polyvinyl alcohol.

Figure 4B:
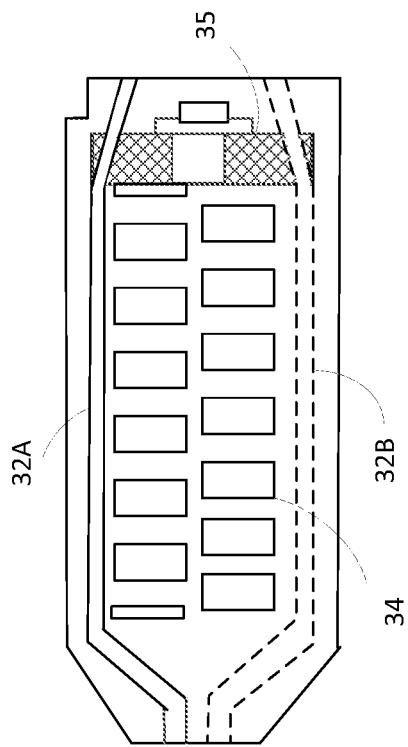
FIG. 4B is a sectional view of an alternative design with the spiral container alongside of the air channel.

As shown in FIG. 4B, alternatively the passage 32 may alongside of the spiral container 34, the passage may have a first branch 32A and/or a second branch 32B.

The end of the housing 340B having the outlet of the spiral container can have a circular notch 344 to accommodate an optional liquid guiding structure 35 for drawing liquid from the outlet 343. The liquid guiding structure 35 can be a gasket of annular shape made of and absorptive material such as glass fibers, wood fibers, carbon fibers, porous ceramics. Liquid in the liquid guiding structure 35 is in contact with the heating element or wicking element of an atomizer such that liquid can be further conducted to the atomizer for vaporization.

The liquid guiding structure 35 can further include one or more pads made of suitable porous fibers such as glass fibers that conduct liquid but not electricity to facilitate conducting liquid to the atomizer.

As shown in FIG. 4A, the inlet 342 of the spiral container can be sealed by a sealing agent 346, such as lithium based grease. The sealing agent is selected such that with consumption of the liquid it moves with the liquid towards the outlet along the container, while it will remain at the current level if no consumption occurs.

Figure 5:
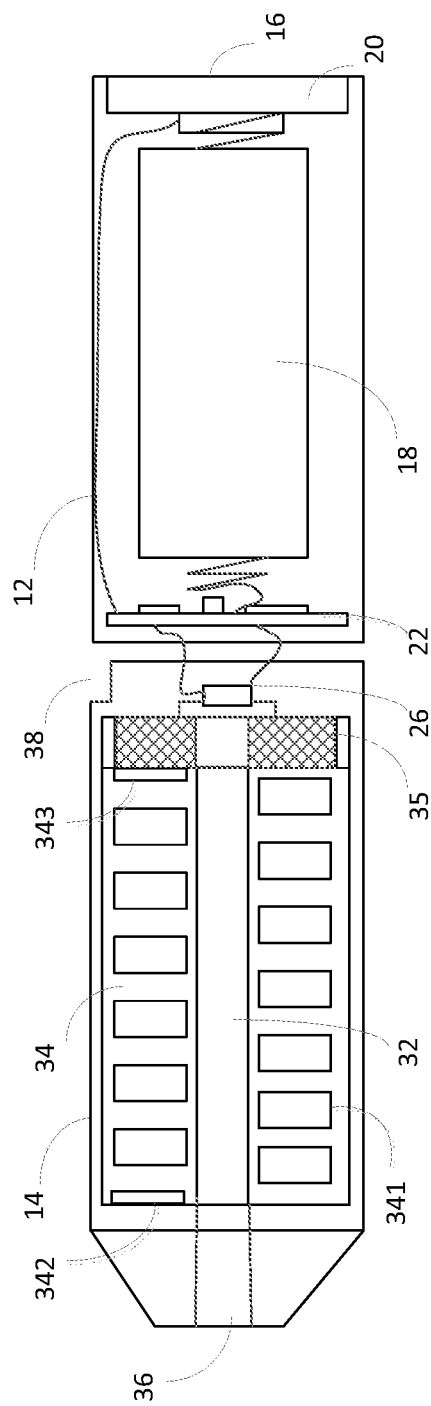
FIG. 5 is a sectional schematic view of an electronic cigarette having a liquid supply with a spiral container.

FIG. 5 is a sectional view of an exemplary electronic cigarette containing any of the liquid supply described above. For example, the electronic cigarette can have a two piece structure having a battery portion 12 and an atomizer/liquid reservoir portion 14. Together the battery portion 12 and the atomizer/liquid reservoir portion 14 form a cylindrical housing which is approximately the same size and shape as a conventional cigarette. An end cap 16 is provided at the front end of the main body 12. The end cap 16 may be made from translucent plastic or other translucent material to allow an LED 20 positioned near the end cap to emit light through the end cap 16. The end cap can be made of metal or other materials that do not allow light to pass.

The battery portion 12 hold a battery unit 18 for powering all electronics 22 and an atomizer 26. The atomizer connects with electronics 22 through two leads. The atomizer/liquid reservoir portion 14 contains a liquid supply 34, the liquid supply is provided with a center passage to allow an aerosol generated at the atomizer to flow therethrough and reach an inhalation port 36. The liquid supply 34 can comprise a spiral container 341 having an inlet 342 and an outlet 343 and winds around the center passage 32. A liquid guiding structure 35, such as a gasket having a though hole and made of porous material, can be provided between the outlet of the spiral container 341. The atomizer 26 contacts one surface of the gasket. The liquid flows from the outlet 343 and an opposite surface contacts liquid conducting leads of the atomizer 26. The liquid conduct leads can be the leads for conducting electricity from the battery 18 as described above or can be leads of a wicking element wound around a heating element or can be part of the heating element of the atomizer if the heating element is made of porous material. A ventilation port 38 is provided either on the atomizer/liquid reservoir portion 14 or on the battery portion 12 to introduce fresh air into the electronic cigarette at least for generating aerosol at the atomizer 26. Sealing agent can be provided at the inlet 342 to seal the liquid within the spiral container to impede movement of the liquid within the container as well as sealing the liquid from contacting the air in the environment.

Three typical states of the exemplary electronic cigarette illustrated in FIG. 5 are shown in FIGS. 6A to 6C. Before the initial use, liquid 330 is sealed within the spiral container 341 as shown in FIG. 6A. The sealing agent is generally in the inlet 342. The sealing agent is selected such that without the capillary action resulted from the liquid consumption at the atomizer 26, a pressure balance can be reached and no liquid leakage will incur even if the electronic cigarette is held in an upright position with the end cap 16 side down. After the initial use, liquid is consumed under capillary action, as shown FIG. 6B. The sealing agent has been drawn together with the liquid towards the outlet. After the liquid in the spiral container 341 is completely consumed, the sealing agent 346 reaches the outlet as shown in FIG. 6C. As the viscosity of the sealing agent is relatively high compared to the liquid, it is not absorbed by the liquid guiding structure or the wicking element or the leads of the atomizer.

In these spiral liquid container designs, liquid moves freely within the container rather than being held by the wadding materials. Therefore the liquid can be completely consumed by the capillary action rather than reaching a half-saturated balance between the wadding material in the container and the liquid guiding structure. As a result, about 10% to 25% of the capacity of the liquid container can be further consumed compared to liquid container with wadding material.

As a result, the sealing agent 346 will then seal the outlet 343 of the container, after the liquid is completely consumed. This design can prevent user from refilling the container with other liquids, such as customized liquid with higher nicotine concentration, for example, at a nicotine concentration more than about 5% to about 7% to 10%, after the original liquid is consumed.

The container with a sealing agent design may also be used with other container shapes that are not spiral, such a cylindrical container.

Figure 7:
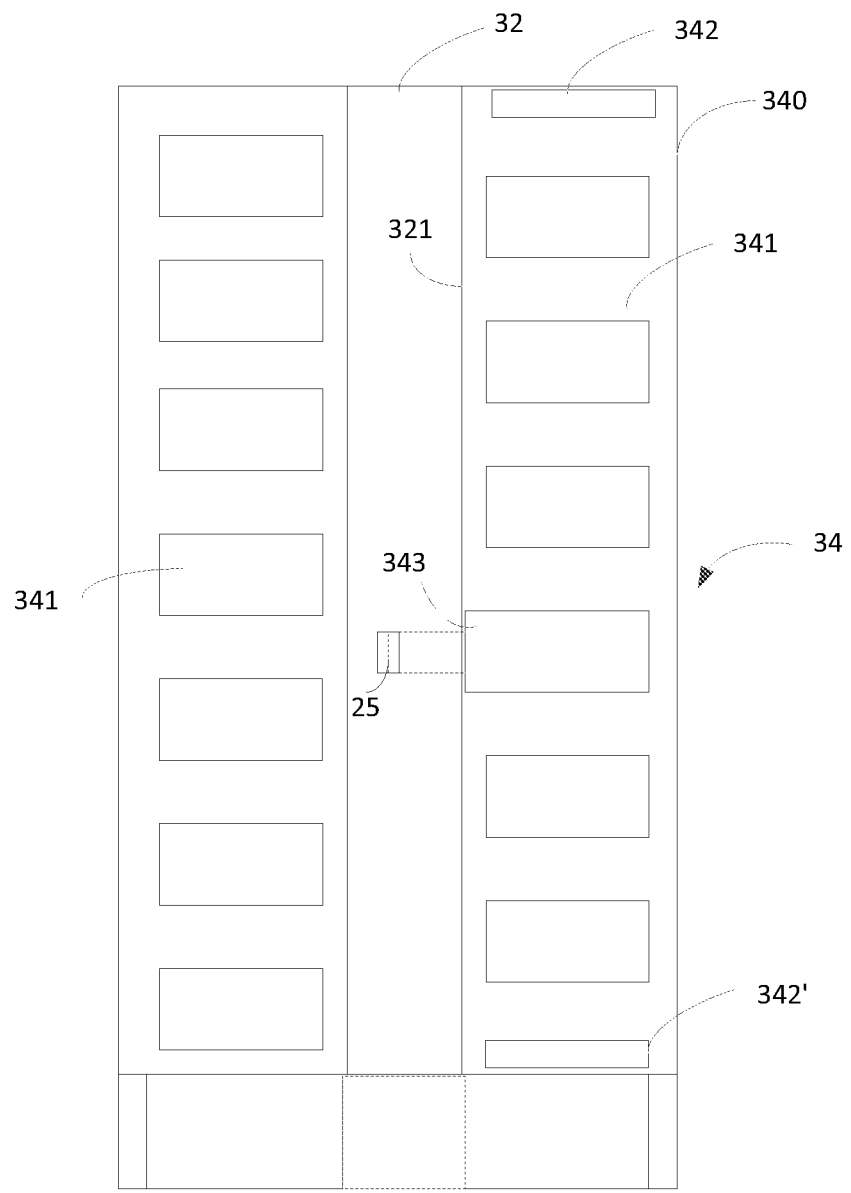
FIG. 7 is a cut-off sectional view of a liquid supply with a spiral container and a center passage and an atomizer arranged in the center passage.
Figure 8:
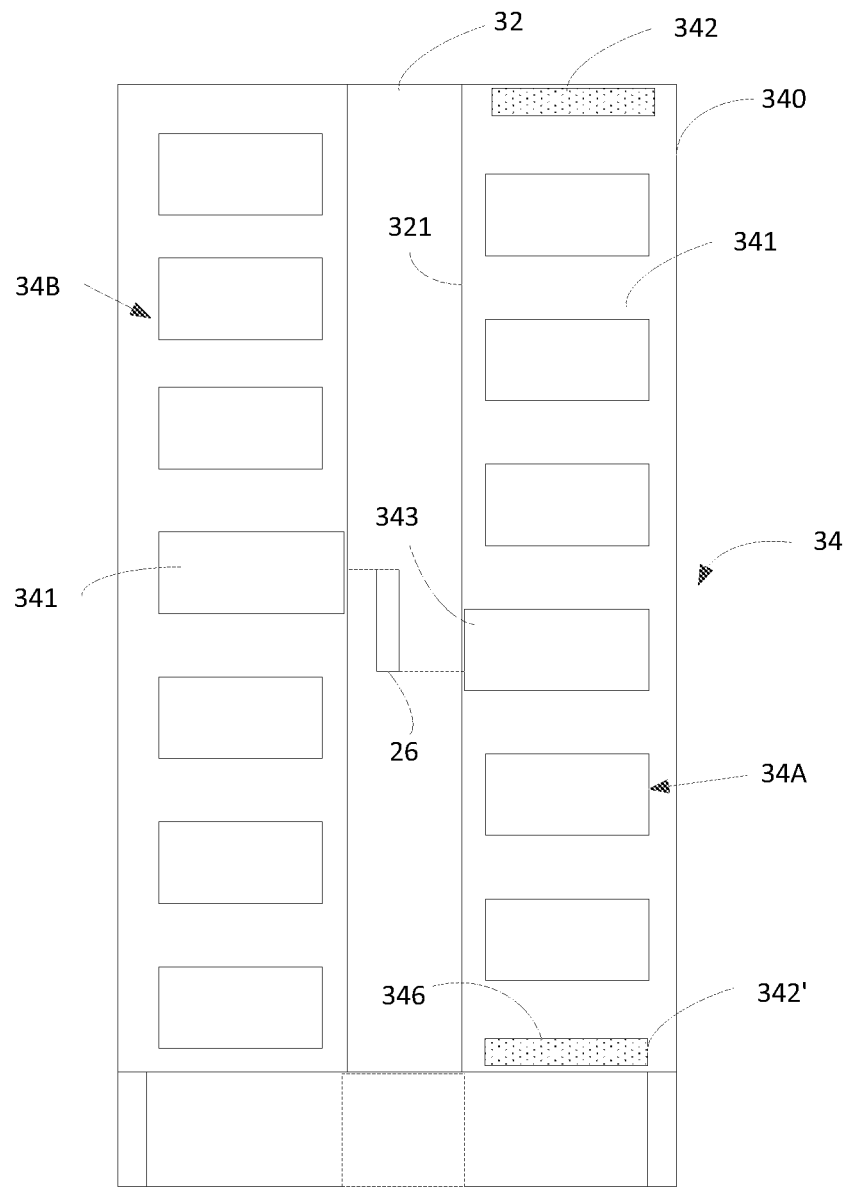
FIG. 8 is a cut-off sectional view of a liquid supply with a spiral container having two compartments.
Figure 9A:
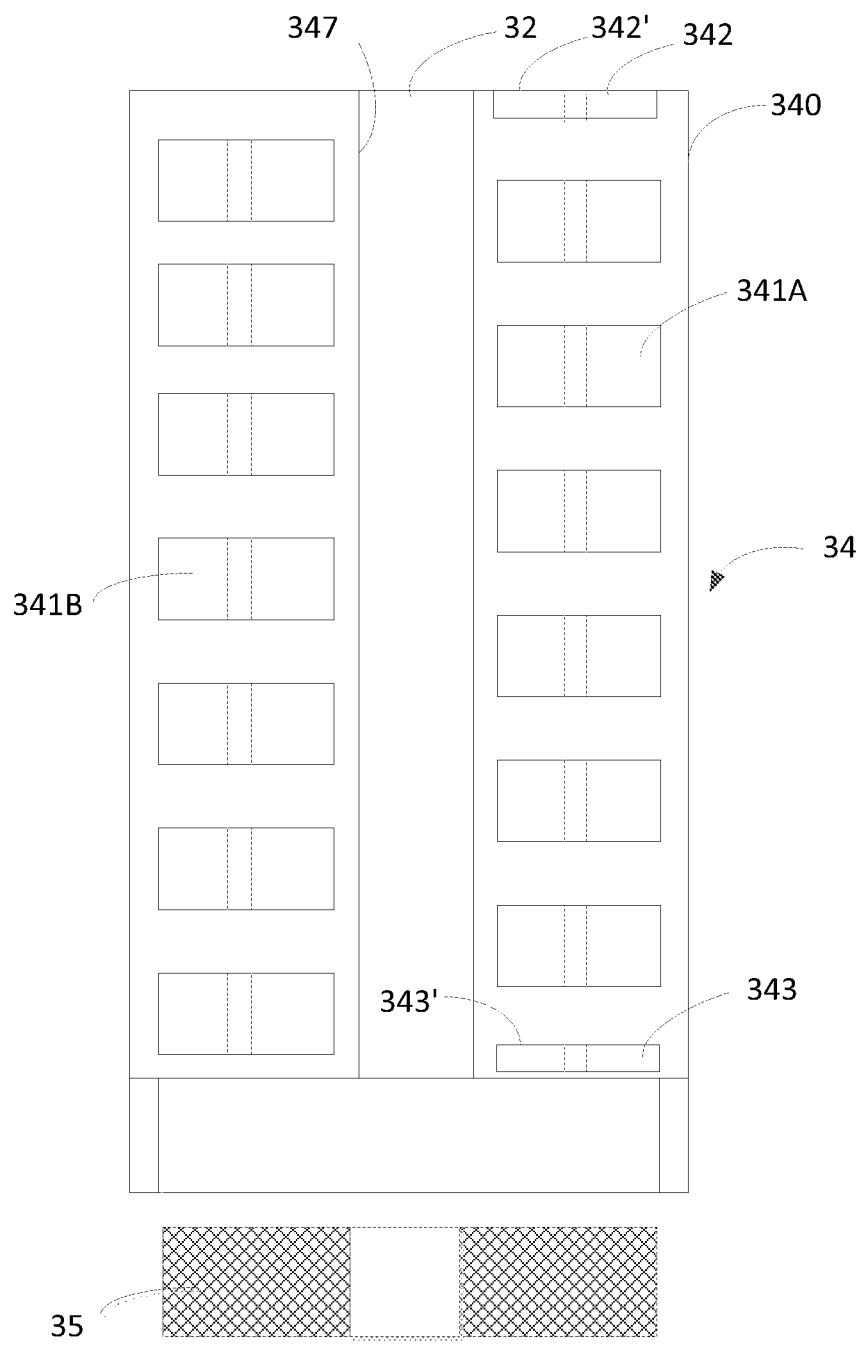
FIGS. 9A and 9B are cut-off sectional views of a liquid supply having two spiral containers with different outlet arrangements.
Figure 9B:
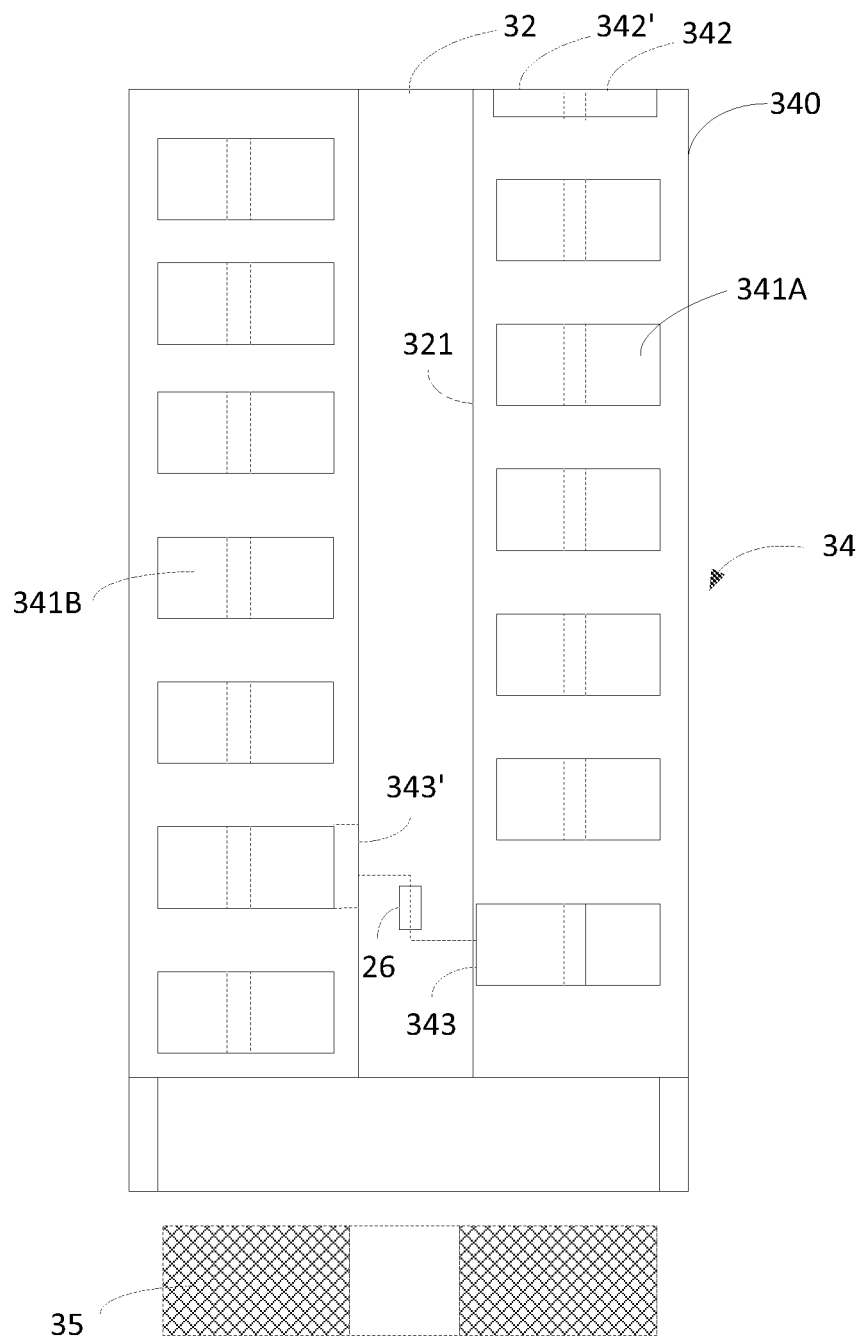

FIG. 7 shows another embodiment liquid supply. The liquid supply 34 comprises a tubular housing 340 having a center passage 32, and a spiral container 341 arranged around the center passage 32 for holding and conducting liquid. the spiral container 341 comprises two inlets 342, 342' arranged at the ends of the tubular housing, i.e., an inner inlet proximate an inhalation port 36, an outer inlet proximate an atomizer 26 where the aerosol is generated, and an outlet 343 arranged anywhere between the two inlets, for example, midway to both inlets, but is preferably provided proximate to the inner inlet. Both inlets are provided in a respective end portion of the housing at a position radially offset from the center passage 32, and the outlet is provided on a surface 321 that defines the wall of the center passage 32.

Both inlets 342, 342' are sealed with sealing agent 346, for example any one of the lithium based greases as described above. after liquid is filled into the spiral container. As the liquid is consumed, the sealing agent at both inlets is drawn towards the outlet and finally seals the outlet after the liquid is completely consumed.

Alternatively, as shown in FIG. 8, the spiral container can be physically separated into two compartments 34A, 34B having separated inlets and outlets. Similar to the design shown in FIG. 7, each inlet 342, 342' of the container is provided in an end of the housing. One outlet 343 is provided at a surface 321 defining the center passage 32 and is in fluid communication with one inlet, for example, the outer inlet 342, another outlet 343' is also provided on the surface 321 that defines the center passage 32 and is in fluid communication with the other inlet, for example the inner inlet 342', such that each compartment is provided with individual inlet and outlet.

Both inlets can be sealed with sealing agent 346 and each outlet is in fluid contact with for example a liquid conducting structure, wicking element an atomizer or a lead of an atomizer for conducting liquid to the atomizer under capillary action.

As illustrated in FIG. 8, the two outlets are positioned to oppose to one another, however, other arrangements such as arranged in angle of 15 degrees, 30 degrees or even aligned in a same longitudinal axis are also possible.

By the two-compartment arrangement, liquid in both compartments is conducted to the liquid conducting structure, wicking element of an atomizer or a lead of an atomizer. The damping action of the sealing agent may be weakened as the entire length of the spiral container has been separated into two sectors, as a result the capillary action can be enhanced and liquid can be drawn faster to the liquid conducting structure, wicking element of an atomizer or a lead of an atomizer.

It is preferable the two compartments of the spiral container have generally same capacity, and the outlets are preferably arranged in an end of each compartment.

The two-compartment design also allows for mixed liquid atomization. For example, one compartment stores nicotine solution and the other compartment stores flavoring solution, or one compartment stores nicotine solution in a concentration of 2% and the other compartment stores nicotine solution in a concentration of 5%. Both solutions reach the atomizer directly or through a liquid guiding structure and are vaporized at the atomizer. With such design, a more flexible and/or customized mixture of nicotine concentration and/or flavors can be achieved.

The embodiment shown in FIG. 9A illustrates a liquid supply comprising two spiral containers 341A, 341B, arranged in parallel with generally identical capacity or different capacity. The two containers can be separated by a partition wall 347 having minimum thickness, for example, a thickness of 0.3 to 0.8 mm to maximize capacities of these containers while maintaining sufficient structural strength. Outlets 343, 343' of the spiral containers can be both provided in an end of the housing 34, while inlets 342, 342' of the spiral containers can be both provided in an opposite end of the housing 34. The outlets can be provided at positions radially offset from the center passage which may facilitate liquid being conducted to for example a liquid guiding structure 35. For example, one outlet can be arranged radially further from the center passage than the other outlet. Alternatively, as illustrated in the example shown in FIG. 9B, the outlets 343, 343' can be provided on the surface that defines the wall of the center passage, which may facilitate conducting liquid to the wicking element or leads of an atomizer 25 in designs where the atomizer is placed within the center passage 32.

The inlets 342, 342' can be sealed with sealing agent such as lithium based grease. The amount of the sealing agent is determined by the capacity of each spiral container.

Each outlet is in fluid contact with the liquid guiding structure, the wicking element, or a lead of the heating element of the atomizer to conduct liquid to the atomizer. Liquid in either spiral container will be drawn to the towards the respective outlet under capillary action once liquid is vaporized at the atomizer.

With the consumption of the liquid in each spiral container, the sealing agent in each container is drawn to the respective outlet of the containers and the outlet of either container will be sealed by the sealing agent once the liquid therein is completely consumed.

Similar to the two-compartment design, liquid supply with two spiral containers can also enable mixed liquid atomization by adding nicotine solutions of different concentrations or solutions in different flavors into the spiral containers.

In addition, in such design, with the reduced diameter of the two spiral container and the sealing agent, flow rate of the liquid within the spiral container can be conveniently controlled within a certain range, and therefore allows for a precise dosage control. This can be desirable when one spiral container contains nicotine solution of high concentration, for example more than 5%, while the liquid contained in the other spiral container is nicotine free.

The viscosity of lithium based grease can be selected based on the diameter/cross-sectional area of the container. For example, for a spiral container with a round cross-section area of about 4~12 $mm^2$, and specifically about 8.3 $mm^2$, the viscosity of the lithium based grease can be about 4200~4600 cs (centistokes) at 25 degrees Celsius. For a spiral container with even smaller cross-section area, for example a spiral container with a cross sectional area of about 2~6 $mm^2$, and more specifically about 4.1 $mm^2$ in a two spiral container design, the viscosity of the lithium based grease can be at about 2800~3400 cs at 25 degrees Celsius.

Materials for forming the housing can be for example ABS (Acrylonitrile Butadiene Styrene), acetal, K Resin, Nylon 6/6-PET( ) Polypropylene, Polyethylene, PA (Polyamide), PC (Polycarbonate), Styrene, SAN (Styrene Acrylonitrile) or TPE (Thermoplastic Elastomer).

The liquid supplies described supra can be fabricated according to following exemplary processes.

In one example, the liquid supply with only one spiral container can be fabricated according to an inject molding process having following steps:

Step 101, inject molding two container pieces with each piece providing half of the entire spiral container and half of the center passage;

Step 102, closing by welding, adhering or bonding the two container pieces in a die;

Step 103, creating an inlet and outlet at the desired location of the container, for example by drilling or milling.

Alternatively, in another example, the liquid supply with only one spiral container can be fabricated according to an electrolyte forming process having following steps:

Step 201, drilling a through hole in a tubular body, for example a metal piece made of stainless steel;

Step 202, extending a spiral die piece along the through hole to a desired position;

Step 203, circulating electrolyte between the spiral die piece and the tubular body to form spiral channels that track the contour of the spiral die piece under electrolytic action; wherein the electrolyte can be $NaNO_3$.

Step 204, attaching a center passage member to the tubular housing such that the spiral channels formed are defined to a single spiral container.

Step 205, Opening inlet and outlet at the desired location of the container by for example drilling or milling.

In yet another example, the liquid supply can also be fabricated by 3D printing via typical 3D printing processes using typical 3D printing materials such as semi-solid material, for example polylactic acid, acrylonitrile butadiene styrene, nylon, polyvinyl alcohol.

As used herein, "about" when used in front of a number means±10% of that number. Reference to fibers includes fiber material (woven or non-woven). Reference to liquid here means liquids used in electronic cigarettes, generally a solution of propylene glycol, vegetable glycerin, and/or polyethylene glycol 400 mixed with concentrated flavors and/or nicotine, and equivalents. References here to fiber materials and capillary action include porous materials, where liquid moves internally through a solid porous matrix. Each of the elements in any of the embodiments described may of course also be used in combination with any other embodiment. Reference to electronic cigarette includes electronic cigars and pipes, as well as components of them, such as cartomizers.

The examples and embodiments described herein are intended to illustrate various embodiments of the invention. As such, the specific embodiments discussed are not to be construed as limitations on the scope of the invention. It will be apparent to one skilled in the art that various equivalents, changes, and modifications may be made without departing from the scope of invention, and it is understood that such equivalent embodiments are to be included herein.

The invention claimed is:

1. A liquid supply for an electronic smoking device comprising:
a spiral liquid container having a first end and a second end;
an outlet at the second end of the spiral liquid container;
liquid in the spiral liquid container;
a sealing agent in the spiral liquid container, the liquid between the sealing agent and the outlet, and the sealing agent movable within the spiral liquid container; and
the outlet of the spiral liquid container on a surface of the air channel.

2. The liquid supply of claim 1 including an air channel extending centrally through the spiral liquid container.

3. The liquid supply of claim 1 further including a housing, with the spiral liquid container insertable into and removable from the housing.

4. The liquid supply of claim 3 further including a filler material or a sealant in a space between the spiral liquid container and a wall of the housing.

5. The liquid supply of claim 1 further including an atomizer positioned to receive liquid from the outlet of the liquid container; and wherein the sealing agent moves through the spiral liquid container by capillary action as the liquid is consumed.

6. The liquid supply of claim 3 with the spiral liquid container having an inlet at the first end of the housing.

7. The liquid supply of claim 5 with the atomizer having a heating element in contact with liquid from the liquid container.

8. The liquid supply of claim 1 wherein the sealing agent comprises grease.

9. The liquid supply of claim 8 wherein the grease comprises a lithium based grease having a viscosity of about 4200~4600 cs at 25 degrees Celsius.

10. A liquid supply for an electronic smoking device comprising:
a housing;
an air channel in the housing connecting an air inlet to an inhalation port;
an atomizer and a liquid container in the housing, the liquid container including first and second spiral containers, with each spiral container containing a liquid;
each spiral container having an inlet and an outlet; and
each inlet sealed by a sealing agent movable through the spiral container, the sealing agent having a viscosity higher than the liquid.

11. The liquid supply of claim 10 wherein the spiral containers are parallel to each other.

12. The liquid supply of claim 10 wherein the inlet of each spiral container is at a first end of the housing, and the outlet of each spiral container is at a second end of the housing opposite from the first end of the housing.

13. The liquid supply of claim 10 wherein the inlets of the spiral containers are at a first end of the housing, and the outlets of the spiral containers lead into the air channel.

14. The liquid supply of claim 10 wherein the spiral containers are wound around the air channel.

15. The liquid supply of claim 10 wherein the sealing agent is lithium based grease.

16. The liquid supply of claim 10 further including a partition wall between the first and second spiral containers.

17. A liquid supply for an electronic smoking device comprising:
a housing;
a spiral liquid container having a first end and a second end, the spiral liquid container insertable into and removable from the housing;
an outlet at the second end of the spiral liquid container;
liquid in the spiral liquid container;
a sealing agent in the spiral liquid container, the liquid between the sealing agent and the outlet, and the sealing agent movable within the spiral liquid container; and
a filler material or a sealant in a space between the spiral liquid container and a wall of the housing.

* * * * *